United States Patent
Krummrich

(10) Patent No.: US 6,621,622 B2
(45) Date of Patent: Sep. 16, 2003

(54) OPTICAL AMPLIFIER AND OPTICAL AMPLIFIER ARRANGEMENT WITH REDUCED CROSS PHASE MODULATION

(75) Inventor: Peter Krummrich, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/932,230

(22) Filed: Aug. 17, 2001

(65) Prior Publication Data

US 2002/0044342 A1 Apr. 18, 2002

(30) Foreign Application Priority Data

Aug. 17, 2000  (DE) .......................................... 100 40 226

(51) Int. Cl.[7] ............................. G02B 6/02; H04V 14/00
(52) U.S. Cl. .................. 359/337.4; 359/161; 359/337.5
(58) Field of Search .............................. 359/161, 337, 359/337.4, 337.5

(56) References Cited

U.S. PATENT DOCUMENTS

| | | | |
|---|---|---|---|
| 5,778,128 A | * 7/1998 | Wildeman | 352/124 |
| 6,011,638 A | * 1/2000 | Mamyshev et al. | 359/179 |
| 6,263,139 B1 | * 7/2001 | Kawakami et al. | 359/161 |
| 6,307,985 B1 | * 10/2001 | Murakami et al. | 359/161 |
| 6,366,728 B1 | * 4/2002 | Way et al. | 359/161 |
| 6,381,048 B1 | * 4/2002 | Chraplyvy et al. | 359/124 |
| 6,427,043 B1 | * 7/2002 | Naito | 359/333 |

OTHER PUBLICATIONS

Chiang et al, Journal of Lightwave Tech., vol. 14, #3, pp 249–260; Abstract only herewith, Mar. 1996.*
Matera et al. CLRO '99, Conference on Lasers and Electro Optics, pp 306–307; abstract only herewith, May 28, 1996.*
Kai et al, Acta Optical Sinica, vol. 19, #4, 519–523; abstract only herewith, Apr. 1999.*
Sano et al, 25th European Conf. in Opt Communication, pp 32–33; abstract only herewith, 1999.*
Shataif, et al., "Nonlinearities in Erbium Doped Fiber Amplifiers," Conference on Optical Amplifiers and their Applications (1999), Jun. 9–11, Nara, Japan, FC2, pp. 270–272.

* cited by examiner

*Primary Examiner*—Nelson Moskowitz
(74) *Attorney, Agent, or Firm*—Bell Boyd & Lloyd LLC

(57) ABSTRACT

An optical amplifier and optical amplifier arrangement with reduced cross phase modulation wherein in an active fiber of the optical amplifier, the fiber being doped with ions of elements from the group of rare earths, in order to reduce the cross phase modulation of the optical amplifier, at least one active fiber section is allocated a dispersion coefficient having a high magnitude, in which the optical transmission signal to be amplified assumes a high signal level.

6 Claims, 2 Drawing Sheets

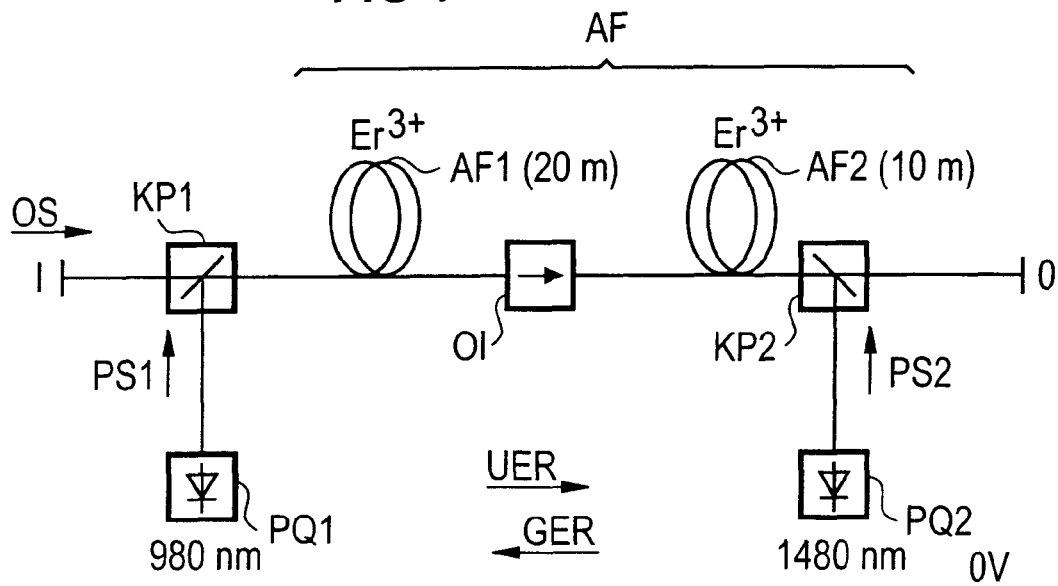
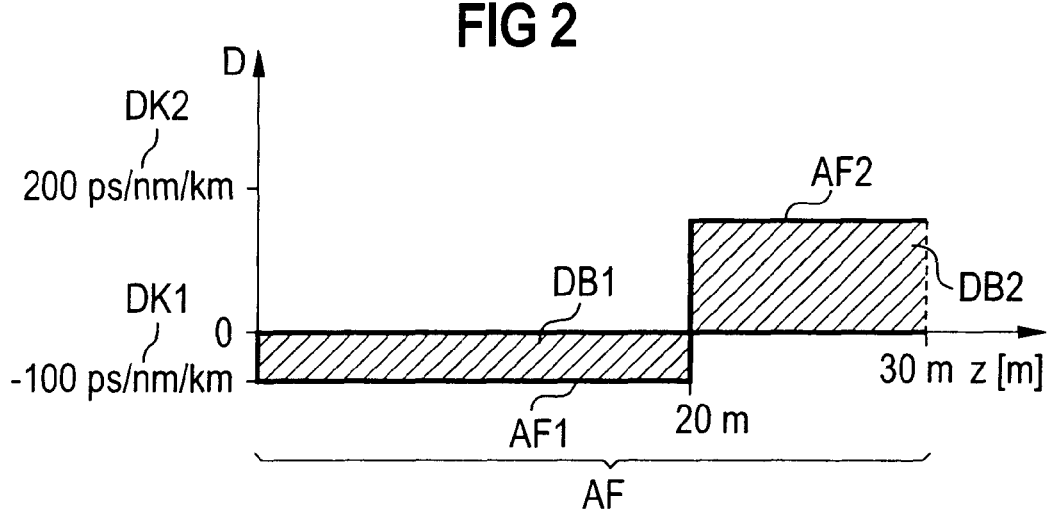

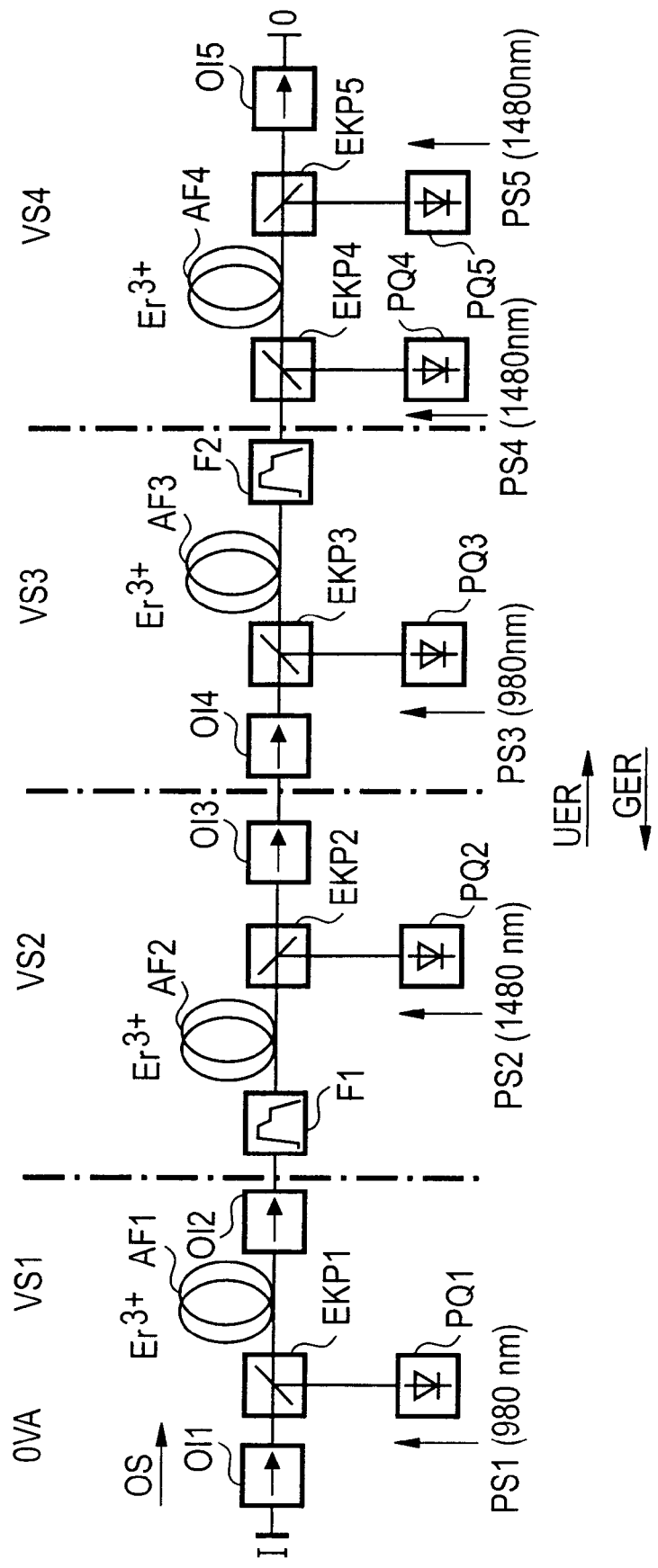

OPTICAL AMPLIFIER AND OPTICAL AMPLIFIER ARRANGEMENT WITH REDUCED CROSS PHASE MODULATION

BACKGROUND OF THE INVENTION

The present invention relates to an optical amplifier having an active fiber doped with ions of elements from the group of rare earths, and an optical amplifier arrangement having a number of cascaded optical amplifier stages each having an active fiber doped with ions of elements from the group of rare earths.

In optical transmission systems for transmitting optical signals at high channel data rates, signal distortions occur as a result of nonlinear effects in the optical fibers or transmission fibers. In particular, the nonlinear effect of cross phase modulation (XPM) can distinctly impair the transmission properties in optical transmission systems with many channels, particularly wavelength division multiplexing (WDM) channels. The active fibers of the optical amplifiers are short compared with the transmission fibers of the optical path sections and thus, they contribute only a fraction of the total length of the optical transmission system. As such, only a small portion of the cross phase modulation contributions occurring in the entire optical transmission system should be attributable to them. However, due to the high signal levels in the optical amplifiers or optical amplifier arrangements and in their active fibers, small mode field diameters can nevertheless lead to an appreciable system impairment due to the cross phase modulation contributions generated there. In this respect, see, M. Shtaif, M. Eiselt: "Nonlinearities in Erbium-doped Fiber Amplifiers", Conference on Optical Amplifiers and their Applications (1999), June 9–11, Nara, Japan, FC2, pp. 270–272.

What is critical for the system impairments caused by the cross phase modulation, in particular at high signal levels, is the fiber length in which two WDM channels experience a slip of at least one bit length. This length is referred to as "walk-off length," for example, in M. Shtaif, M. Eiselt: "Nonlinearities in Erbium-doped Fiber Amplifiers", Conference on Optical Amplifiers and their Applications (1999), June 9–11, Nara, Japan, FC2, pp. 270–272. The walk-off length and also the influence of the cross phase modulation decreases with rising dispersion.

In known optical transmission systems, in particular WDM transmission systems, the system impairment due to the cross phase modulation in the optical amplifiers or amplifier arrangements is manifested only to a slight extent as a result of the low signal levels or large channel spacings used in the transmission of optical signals. Measures for reducing the cross phase modulation in the optical amplifiers are not provided, therefore, in currently known or commercially available optical amplifiers or amplifier arrangements. However, the cross phase modulation contributions, and thus system impairments, brought about by the optical amplifiers will increase in future optical transmission systems due to the rising number of WDM channels required for transmission and the reduced channel spacings as a result of this.

Furthermore, optical fiber amplifiers or amplifier arrangements, in particular erbium-doped fiber amplifiers, developed specifically for the utilization of the L transmission band have longer active fibers than the optical amplifiers designed for the C transmission band. For the aforementioned reasons, reducing the cross phase modulation in optical amplifiers, in particular for future optical transmission systems, is accorded immense importance.

An object of the present invention, therefore, is to reduce the nonlinear effect of cross phase modulation which forms in the active fiber of an optical amplifier or optical amplifier arrangement. Such object is achieved on the basis of an optical amplifier in accordance with the teachings of the present invention.

SUMMARY OF THE INVENTION

An advantage of the present invention's optical amplifier having an active fiber doped with ions of elements from the group of rare earths can be seen in the fact that the active fiber has at least one active fiber section for reducing the cross phase modulation of the optical amplifier, the active fiber section being allocated a dispersion coefficient having a high magnitude, in which the optical transmission signal to be amplified assumes a high signal level. In the amplifier according to the present invention, the active fiber is advantageously designed in such a way that, in the active fiber sections in which high signal levels occur, the active fiber in each case has a high dispersion coefficient which, in turn, leads to a major slip of the channels. Due to the major slip between the channels or WDM channels, the nonlinear effect of cross phase modulation is considerably reduced in the active fiber. However, to ensure that the high dispersion coefficients of the active fibers do not, for their part, lead to signal distortions within the optical transmission signal, the active fiber section of the active fiber in which high signal levels occur (usually the last part of the active fiber) is allocated a dispersion coefficient having a high magnitude; i.e., a high positive or negative dispersion coefficient.

The lengths of the individual active fiber sections are advantageously calculated taking account of the dispersion coefficients present in the active fiber sections in such a way that the total dispersion of the amplifier assumes a minimum value or the optical amplifier has a total dispersion of at least virtually zero.

Additional features and advantages of the present invention are described in, and will be apparent from, the following detailed description of the invention.

BRIEF DESCRIPTION OF THE FIGURES

FIG. 1 shows, by way of example, in a basic circuit diagram, an optical amplifier having a first and a second active fiber section;

FIG. 2 shows, by way of example, in a diagram, the dispersion coefficients of the first and second active fiber sections along the active fiber; and FIG. 3 shows, by way of example, in a further basic circuit diagram, an optical amplifier arrangement having a number of cascaded optical amplifier stages.

DETAILED DESCRIPTION OF THE INVENTION

FIG. 1 illustrates, for example, an optical amplifier OV having an active fiber AF doped with ions of elements from the group of rare earths; in particular, erbium $ER^{3+}$-doped active fiber AF, whose active fiber AF is divided into two active fiber sections AF1, AF2, (specifically, a first fiber section AF1 and a second active fiber section AF2), for reducing the cross phase modulation of the optical amplifier. Furthermore, the optical amplifier OV has an input I, a first coupling point KP1, a first pump source PQ1, an optical isolator 01, a second coupling point KP2, a second pump source PQ2 and an output O. The input I of the optical amplifier OV is connected to the input of the first coupling point KP1, whose output is connected to the input of the active fiber AF or to the input of the first active fiber section AF. The first pump source PQ1 is connected to the pump input of the first coupling point KP1. The output of the first active fiber section AF1, which has a length of approximately 20 m in the exemplary embodiment illustrated, is connected to the input of the optical isolator OI, whose output is connected to the input of the second active fiber section AF2. The second active fiber section AF2 has a length of 10 m in the exemplary embodiment illustrated. The output of the second active fiber section AF2 is connected to the input of the second coupling point KP2, whose output is connected to the output O of the optical amplifier OV. The pump input of the second coupling point KP2 is connected to the second pump source PQ2.

In order to amplify the optical transmission signal OS or optical signal OS, a first and second pump signals PS1, PS2 are generated in the first pump source PQ1 and in the second pump source PQ2, respectively. The first pump signal PS1, having a wavelength of 980 nm, for example, in FIG. 1, is coupled via the first coupling point KP1 in the transmission direction UER into the active fiber AF or into the first active fiber section AF1. The optical signal OS transmitted from the input I of the optical amplifier OV to the first coupling point KP1 is coupled into the active fiber AF or the first active fiber section AF1 and experiences amplification due to the optical first pump signal PS1 additionally coupled in. The optical transmission signal or signal OS amplified in this way is transmitted from the output of the first active fiber section AF1 via the optical isolator OI to the input of the second active fiber section AF2.

The second active fiber section AF2 or the active fiber AF2 is pumped with the aid of the second pump signal PS2 in the opposite transmission direction GER. For this purpose, the second pump signal PS2, for example having a wavelength of 1480 nm, which is generated in the second pump source PQ2, is fed via the second coupling point KP2 in the opposite transmission direction GER into the active fiber AF or in the second active fiber section AF2. The optical signal OS passing through the second active fiber section AF2 experiences further amplification due to the second pump signal PS2 coupled in and is transmitted to the output of the second active fiber section AF2 or of the active fiber AF. From the output of the second active fiber section AF2, the optical signal OS is controlled via the second coupling point KP2 to the output O of the optical amplifier OV.

The present invention's negative or positive dispersion coefficients DK1, DK2 of the first or second active fiber sections AF1, AF2 are illustrated, by way of example, in a diagram in FIG. 2. The diagram has a horizontal axis and a vertical axis, the spatial variable z being plotted in meters (m), for example, on the horizontal axis and the dispersion coefficient D being plotted in ps/nm/km on the vertical axis. In the exemplary embodiment illustrated, the first active fiber section AF1 has a first negative dispersion coefficient DK1 of, for example, 100 ps/nm/km and extends over a length of approximately 20 m. The second active fiber section AF2 has a second positive dispersion coefficient DK2 of, for example, 200 ps/nm/km and has a length of approximately 10 m. This results in a total length of the active fiber AF of approximately 30 m. The dispersion contribution brought about by the first fiber section AF1 in the optical amplifier OV is illustrated in the diagram as a hatched first area enclosed by the horizontal axis, the vertical axis and the curve indicating the dispersion coefficient profile. In this case, the first dispersion contribution DB1 brought about by the first active fiber section AF1 is negative. The second dispersion contribution DB2, which is likewise shown hatched, is brought about by the second active fiber section AF2 and represents the second area content which is enclosed by the horizontal axis Z and the curve indicating the dispersion coefficient profile and is likewise shown hatched in FIG. 2. The second dispersion contribution DB2 is positive. The overall result, then, is a total dispersion of the optical amplifier OV of at least virtually 0.

The diagram illustrated in FIG. 2 reveals, inter alia, that the active fiber section AF2 is, in each case, allocated a dispersion coefficient having a high magnitude in which the optical transmission signal OS to be amplified assumes a high signal level. In the second active fiber section AF2, in particular, the signal level of the optical transmission signal OS is higher than in the first active fiber section AF1, especially as the optical transmission signal OS experiences preamplification by the first active fiber section AF1.

Furthermore, it can be discerned that, along the active fiber AF, the active fiber sections AF1, AF2, in particular the first and second active fiber sections AF1, AF2, alternately assume a negative or positive dispersion coefficient DK1, DK2; i.e., the diagram illustrated in FIG. 2 makes it clear, in particular, that the first active fiber section AF1 has a first dispersion coefficient DK1 of 100 ps/nm/km and the second active fiber section AF2 has a second dispersion coefficient DK2 of 200 ps/nm/km.

The present invention's distribution of the dispersion properties of the active fiber AF with the aid of the active fiber sections AF1, AF2 enables the cross phase modulation that occurs or is brought about in the optical amplifier OV to be reduced. The following physical relationship is crucial for this technical effect: the cross phase modulation increases as the "walk-off length"; increases, walk-off length being understood to be the fiber length in which two optical WDM channels experience a slip of at least one bit length. In other words: the walk-off length and also the influence of cross phase modulation within the optical amplifier OV decrease with rising dispersion or with a high dispersion contribution. On account of the active fiber AF which, in the optical amplifier OV according to the present invention, is divided into a number of active fiber sections AF1, AF2 and has dispersion coefficients DK1, DK2 of different magnitudes, a major slip being generated only in the active fiber sections AF1, AF2 in which high signal levels occur. By virtue of this major slip, the contribution of the respective active fiber section AF1, AF2 to the total cross phase modulation of the optical amplifier OV is distinctly reduced. For this purpose, according to the present invention, it is necessary to provide high dispersion coefficients at the locations of the active fiber AF at which high signal levels of the optical transmission signal OS occur.

The high dispersion contributions generated as a result of this within the optical amplifier OV, in turn, have to be compensated by high dispersion contributions—having opposite signs—by the further active fiber sections AF1 in order to keep the total dispersion of the optical amplifier OV low. In this case, the lengths of the individual active fiber sections AF1, AF2 and the dispersion coefficients DK1, DK2 of the individual fiber sections AF1, AF2 are selected such that the total dispersion of the optical amplifier OV has a minimum value or turns out to be virtually 0.

In the case of the embodiment of the present invention as illustrated with the aid of FIG. 1 and FIG. 2, the first active fiber section AF1 is embodied as a preamplifier which amplifies the optical signal OS with as little noise as possible up to a medium signal level. The second active fiber section AF2 operates as a power amplifier which enables the signal level of the already preamplified optical signal OS to be raised to a high output level.

FIG. 3 illustrates by way of example the present invention's optical amplifier arrangement OVA having a number of cascaded optical amplifier stages VS1, VS2, VS3, VS4, which each have an active fiber AF1, AF2, AF3, AF4 doped with ions of elements from the group of rare earths. The optical amplifier arrangement OVA has, in particular, a first, second, third and fourth amplifier stage VS1 to VS4, although it is entirely possible to arrange fewer or further amplifier stages VS for the optical amplifier arrangement OVA according to the present invention.

The optical amplifier arrangement OVA has an input I and an output O, the input I simultaneously being the input of the first optical amplifier stage VS1 and the output O being the output of the fourth optical amplifier stage VS4. The first optical amplifier stage VS1 has a first optical isolator OI1, a first coupling-in point EKP1, a first pump source PQ1, a first active fiber AF1 and a second optical isolator OI2. The input of the first optical isolator OI1 is connected to the input of the optical amplifier arrangement OVA. Furthermore, the output of the first optical isolator OI1 is connected to the input of the first coupling-in point EKP1, whose output is connected to the input of the first active fiber AF1. The first pump source PQ1 is connected to the coupling-in input of the first coupling-in point EKP1. The output of the first active fiber AF1, in particular an erbium-doped fiber, is connected to the input of the second optical isolator OI2. The output of the second optical isolator is connected to the second optical amplifier stage VS2, or to the input thereof.

The second optical amplifier stage VS2 has a first optical filter V1, a second active fiber AF2, a second coupling-in point EKP2, a second pump source PQ2 and a third optical isolator OI3. The input of the second optical amplifier stage VS2 is connected to the input of the first optical filter F1, and the output of the first optical filter F1 is connected to the input of the second active fiber AF2; for example, an erbium-doped fiber. Connected to the output of the second active fiber AF2 is the input of the second coupling-in point EKP2, whose output is connected to the third optical isolator or the input OI3 thereof. Furthermore, the coupling-in input of the second coupling-in point EKP2 is connected to the second pump source PQ2. The output of the third optical isolator OI3 is connected to the output of the second amplifier stage VS2. The third optical amplifier stage VS3 is connected to the second optical amplifier VS2.

The third optical amplifier stage VS3 has a fourth optical isolator OI4, a third coupling-in point EKP3, a third pump source PQ3, a third active fiber AF3 and a second optical filter F2. The input of the third optical amplifier stage VS3 is connected to the input of the fourth optical isolator OI4, whose output is connected to the input of the third coupling-in point EKP3. The output of the third coupling-in point EKP3 is connected to the input of the third active fiber AF3 and its coupling-in input is connected to the third pump source PQ2. The output of the third active fiber AF3 is connected to the input of the second optical filter F2, whose output is connected to the output of the third optical amplifier stage VS3. The fourth optical amplifier stage VS4 is connected downstream of the third optical amplifier stage VS3.

The fourth optical amplifier stage VS4 has a fourth coupling-in point EKP4, a fourth pump source PQ4, a fourth active fiber AF4, a fifth coupling-in point EKP5, a fifth pump source PQ5 and a fifth optical isolator OI5. The input of the fourth coupling-in point EKP4 is at the same time the input of the fourth optical amplifier stage VS4, and the output of the fourth coupling-in point EKP4 is connected to the input of the fourth active fiber AF4. The coupling-in input of the fourth coupling-in point EKP is connected to the fourth pump source PQ4. The output of the fourth active fiber AF4 is connected to the input of the fifth coupling-in point EKP5, whose output is connected to the input of the fifth optical isolator OI5. The coupling-in input of the fifth coupling-in point IKP5 is connected to the fifth pump source PQ5. The output of the fifth optical isolator OI5 and at the same time the output of the fourth optical amplifier stage VS4 is connected to the output O of the optical amplifier arrangement OVA.

Analogously to FIG. 1, in FIG. 3 or in the optical amplifier arrangement OVA illustrated in FIG. 3, an optical signal OS is coupled in at the input I of the optical amplifier arrangement OVA and transmitted via the first, second, third and fourth optical amplifier stages to the output O of the optical amplifier arrangement OVA. In this case, in the respective amplifier stages VS1, VS2, VS3, VS4, the optical signal OS experiences different amplifications and, according to the present invention, different dispersion contributions. In order to reduce the cross phase modulation of the entire optical amplifier arrangement OVA, the active fibers AF1, AF2, AF3, AF4 of the optical amplifier stages VS1, VS2, VS3, VS4 have negative and positive dispersion coefficients DK1, DK2 having different magnitudes. By way of example, along the optical amplifier arrangement OVA, the active fibers AF1, AF2, AF3, AF4 may alternately assume a positive or negative dispersion coefficient DK1, DK2, it being quite possible for individual amplifier stages VS1, VS2, VS3, VS4 to assume a dispersion coefficient DK1, DK2 virtually having the value zero. That is, what is crucial for the invention's reduction of the cross phase modulation within the amplifier arrangement OVA is that the active fibers AF1 to AF4 of the optical amplifier stages VS1 to VS4 have a high, positive or negative dispersion coefficient in which the optical signal OS assumes a high signal level.

The optical signal OS coupled-in at the input of the optical amplifier arrangement OVA is transmitted in the first optical amplifier stage VS1 via the first optical isolator OI1 to the first coupling-in point EKP1 and is finally coupled into the first active fiber AF1. In addition, a first pump signal PS1 generated in the first pump source PQ1 and, for example, having a wavelength of 980 nm is fed via the first coupling-in point EKP1 in the transmission direction UER into the first active fiber AF1. As a result, the optical signal OS experiences amplification when passing through the first active fiber AF1 and the amplified optical signal OS is transmitted via the second optical isolator OI2 to the output of the first amplifier state VS1, or input of the second amplifier stage VS2. With the aid of the first optical filter F1 arranged in the second optical amplifier stage VS2, the gain spectrum of the preamplified optical signal OS is leveled and fed to the second active fiber AF2 for further amplification. The second active fiber AF2 is pumped with the aid of a second pump signal PS2, which is generated in the second pump source PQ2 and is coupled via the second coupling-in point EKP2 in the opposite transmission direction GER into the second active fiber AF2. The optical signal OS amplified in this way is transmitted from the output of the second active fiber AF2 via the second coupling-in point EKP2 and via the third optical isolator OI3 to the output of the second optical amplifier stage VS2, or it is transferred to the input of the third optical amplifier stage VS3.

In the third optical amplifier stage VS3, the optical signal OS passes through the fourth optical isolator IO4 and is then coupled via the third coupling-in point EKP3 into the third active fiber AF3 for amplification. Analogously to the first optical amplifier stage VS1, the third active fiber AF3 is amplified with the aid of the third pump signal PS3 generated in the third pump source PQ3, the third pump signal being coupled via the third coupling-in point EKP3 into the third active fiber F3. The wavelength of the third optical pump signal PS3 is in the region of 980 nm in the exemplary embodiment illustrated. The optical signal OS amplified with the aid of the third active fiber AF3 and the third optical pump signal PS3 is filtered again with the aid of the second optical filter; i.e., the gain spectrum of the optical signal OS is leveled again. The leveled optical signal OS present at the output of the second optical filter F2 is transmitted to the fourth optical amplifier stage VS4. The fourth optical amplifier stage VS4 is constructed as a high-power or power amplification stage; i.e., the fourth active fiber AF4 is pumped both in the transmission direction UER and in the opposite transmission direction GER. For this purpose, a fourth pump signal PS4 generated in the fourth pump source PQ4 is coupled via the fourth coupling-in point EKP4 in the transmission direction UER into the fourth active fiber AE4. Furthermore, a fifth pump signal PS5 generated in the fifth pump source PQ5 is fed via the fifth coupling-in point EKP5 in the opposite transmission direction GER into the fourth active fiber AF4. The optical transmission signal OS fed into the fourth active fiber AF4 via the fourth coupling-in point EKP4 then experiences amplification with the aid of the fourth and fifth pump signals PS4, PS5 and, after leaving the fourth active fiber AF4, is transmitted via the fifth coupling-in point EKP5 and via the fifth optical isolator OI5 to the output O of the fourth optical amplifier stage or of the optical amplifier arrangement OVA.

The optical amplifier arrangement illustrated has, by way of example, a number of optical amplifier stages VS1, VS2, VS3, VS4, in which case dispersion compensation units or variably adjustable attenuation elements additionally may be arranged between the individual amplifier stages VS1, VS2, VS3, VS4—not illustrated in FIG. 2.

For achievement of the present invention, the dispersion coefficients of the active fibers AF1 to AF4 are required to have high magnitudes; such dispersion coefficients can be achieved, for example, with the aid of optical single-stage or multi-stage fibers which are optimized with regard to the core diameter and the refractive index jumps.

Furthermore, the present invention's division of the active fiber AF of an optical amplifier OV into a number of active fiber sections AF1, AF2 which have at least one negative and positive dispersion coefficient is also possible for the active fibers AF1 to AF4 of the optical amplifier arrangement OVA. That is, by way of example, the first active fiber AF1 of the first amplifier stage VS1 can be constructed from a number of active fiber sections having different dispersion coefficients.

Although the present invention has been described with reference to specific embodiments, those of skill in the art will recognize that changes may be made thereto without departing from the spirit and scope of the invention as set forth in the hereafter appended claims.

What is claimed is:

1. An optical amplifier comprising an active fiber doped with ions of elements selected from the group consisting of rare earths, wherein the active fiber comprises at least two active fiber sections, which have at least one negative dispersion coefficient and at least one positive dispersion coefficient, for reducing cross phase modulation of the optical amplifier, and wherein the at least one negative dispersion coefficient and the at least one positive dispersion coefficient have different magnitudes, with the higher magnitude dispersion coefficient being allocated to one of the at least two active fiber sections in which an optical transmission signal to be amplified assumes a higher signal level than in the remaining of the at least two active fiber sections.

2. An optical amplifier as claimed in claim 1, wherein the optical amplifier has a total dispersion of at least virtually zero.

3. An optical amplifier as claimed in claim 1, wherein there are at least two active fiber sections such that, along the active fiber, the active fiber sections alternately assume positive and negative dispersion coefficients.

4. An amplifier arrangement comprising a plurality of cascaded optical amplifier stages which each have an active fiber doped with ions of elements selected from the group consisting of rare earths, wherein at least two of the active fibers of the plurality of cascaded optical amplifier stages have at least one negative dispersion coefficient and at least one positive dispersion coefficient, for reducing cross phase modulation of the optical amplifier arrangement, and wherein the dispersion coefficients of the active fibers have respectively different magnitudes, with the higher magnitude dispersion coefficient being allocated to one of the at least two active fiber sections in which an optical transmission signal to be amplified assumes a higher signal level than in the remaining of the at least two active fiber sections.

5. An optical amplifier arrangement as claimed in claim 4, wherein the optical amplifier arrangement has a total dispersion of at least virtually zero.

6. An optical amplifier arrangement as claimed in claim 4, wherein, along the optical amplifier arrangement, the active fibers of the plurality of cascaded optical amplifier stages alternately assume positive and negative dispersion coefficients.

* * * * *